United States Patent
Potier et al.

(10) Patent No.: US 7,754,332 B2
(45) Date of Patent: Jul. 13, 2010

(54) THERMAL INSULATION STRUCTURES COMPRISING LAYERS OF EXPANDED GRAPHITE PARTICLES COMPRESSED TO DIFFERENT DENSITIES AND THERMAL INSULATION ELEMENTS MADE FROM THESE STRUCTURES

(75) Inventors: Alexandre Potier, Genevilliers (FR); Dominique Berger, Montigny les Corneilles (FR); Christophe Bommier, Basking Ridge, NJ (US); Olivier Raymond, Cagny (FR); Jerome De Wasch, Genevilliers (FR)

(73) Assignee: Carbone Lorraine Composants, Gennevilliers (FR)

( * ) Notice: Subject to any disclaimer, the term of this patent is extended or adjusted under 35 U.S.C. 154(b) by 1084 days.

(21) Appl. No.: 10/541,627

(22) PCT Filed: Jan. 8, 2004

(86) PCT No.: PCT/EP2004/001017

§ 371 (c)(1),
(2), (4) Date: Apr. 26, 2006

(87) PCT Pub. No.: WO2004/063612

PCT Pub. Date: Jul. 29, 2004

(65) Prior Publication Data

US 2006/0220320 A1 Oct. 5, 2006

(30) Foreign Application Priority Data

Jan. 8, 2003 (FR) ................................ 03 00140

(51) Int. Cl.
*B32B 5/16* (2006.01)
(52) U.S. Cl. ..................... 428/408; 428/212; 428/920; 428/921

(58) Field of Classification Search ................. 277/650, 277/308, 204, 227; 523/179; 428/408, 212, 428/921, 920
See application file for complete search history.

(56) References Cited

U.S. PATENT DOCUMENTS

| 3,404,061 | A | | 10/1968 | Bochman et al. |
| 4,279,952 | A | * | 7/1981 | Kodama et al. ............ 428/36.1 |
| 4,888,242 | A | | 12/1989 | Matsuo et al. |
| 5,509,993 | A | | 4/1996 | Hirschvogel |
| 5,573,253 | A | | 11/1996 | Naitou et al. |
| 5,582,781 | A | | 12/1996 | Hayward |
| 6,413,601 | B1 | | 7/2002 | Blain et al. |
| 2002/0182387 | A1 | | 12/2002 | Getz et al. |

FOREIGN PATENT DOCUMENTS

| EP | 0 263 402 | 4/1988 |
| EP | 0 433 478 | 6/1991 |
| WO | WO 01/78460 | 10/2001 |

* cited by examiner

Primary Examiner—Gwendolyn Blackwell
(74) Attorney, Agent, or Firm—Young & Thompson

(57) ABSTRACT

Thermal insulation structure having at least one flexible layer based on compressed expanded graphite particles characterized in that the density of the said flexible layer is equal to at least 0.4 g/cm3 (400 kg/m$^3$) and in that the thermal insulation structure also includes another layer close to the flexible layer based on compressed graphite particles with a lower density, typically less than 0.4 g/cm$^3$ (400 kg/m$^3$). Preferably, the dense compressed expanded graphite layer has a density of between 0.5 and 1.6 g/cm$^3$ (500 and 1600 kg/m$^3$) and the sub-dense compressed expanded graphite layer has a density of between 0.05 and 0.3 g/cm$^3$ (50 and 300 kg/m$^3$). Thermal insulation elements are also described that are designed to be fitted on furnaces operating under non-oxidizing atmosphere and at temperatures of more than 800° C.

16 Claims, No Drawings

THERMAL INSULATION STRUCTURES COMPRISING LAYERS OF EXPANDED GRAPHITE PARTICLES COMPRESSED TO DIFFERENT DENSITIES AND THERMAL INSULATION ELEMENTS MADE FROM THESE STRUCTURES

TECHNICAL FIELD

This invention relates to the manufacture of refractory carbonaceous materials that can be used as high temperature thermal insulation in furnaces operating at high temperatures and under a non-oxidising atmosphere.

BACKGROUND OF THE INVENTION

Equipment operating at high temperature in a wide variety of domains such as the manufacture of electronic components, optical fibres, reactor blades, etc. uses different forms of carbon-based thermal insulation. The reasons for this choice are:

- the refractory nature of carbon, which is solid up to 3000° C.;
- the low thermal conductivity of low density carbon base materials;
- a relatively low production cost;
- the possibility of obtaining very pure carbon and consequently limiting possible contamination of elements being worked at high temperature, which is an essential aspect for processes related to the electronic industry.

The most frequently used forms of carbon-based thermal insulation are:

- bricks based on carbon powder bonded together by a binder derived from carbonation of a liquid rich in carbonaceous material (e.g. pitch, phenolic resin, etc.). These bricks are very economic and are widely used in metallurgy (blast furnaces, furnaces with atmosphere saturated in CO);
- so-called flexible carbon fibre felts made from carbon and/or graphite fibres formed into low-density felts, typically with a density of 0.1 g/cm3 (100 kg/m3);
- so-called rigid carbon fibre felts, made from carbon and/or graphite fibres, bonded together by binders derived from carbonation of a liquid rich in carbonaceous material, or by deposition of a pyrocarbon in the gaseous phase onto a fibrous preform to be consolidated. The densities of these rigid felts are between 0.1 g/cm3 (100 kg/m3) and 0.3 g/cm3 (300 kg/m3);
- carbon black, contained in a chamber to form a compacted powder wall between the hot area to be insulated and a cold environment. Densities of compacted carbon black typically vary between 0.05 g/cm3 (50 kg/m3) and 0.2 $g/cm^3$ (200 $kg/m^3$);
- finally, the last family consists of materials described in particular in patent U.S. Pat. No. 3,404,061, and comprises particles of expanded graphite compressed in the absence of a carbonaceous binder to obtain solid structures with densities typically between 5 and 137 pounds per cubic foot, in other words between about 80 $kg/m^3$ and 2300 $kg/m^3$. There are several means of obtaining expanded graphite particles. They are described for example in U.S. Pat. No. 3,404,061 (milling, attack of spaces between hexagonal reticular planes by oxidising or halogenated agent water impregnation, heating to a temperature of more than 100° C.) or in U.S. Pat. No. 5,582,781 (milling, immersion in liquid nitrogen then thermal shock). In general, expanded natural graphite is used. When the compression applied to expanded graphite particles results in a density of more than about 0.4 $g/cm^3$ (400 $kg/m^3$), flexible graphite strips having a good mechanical strength are obtained.

Each type of thermal insulation mentioned above has advantages and drawbacks which make its use more or less suitable for the special needs of each process.

The invention relates particularly to thermal insulation structures based on compressed expanded graphite particles. Presently, these structures are not very widely used, in comparison with structures based on carbon fibres. They are two types of reasons against a broad distribution of these products, despite their very competitive thermal properties:

1) structures based on compressed expanded graphite particles are very fragile if their density is less than about 0.2 $g/cm^3$ (200 $kg/m^3$), structures with densities lower than this value are extremely fragile and are practically impossible to use;
2) the most natural solution to overcome this problem of extreme fragility is to increase the densities obtained after compression, but the result is then the loss of insulation performance;
3) techniques for manufacturing this type of structure are not very productive.

They generally involve the following steps:

- an extremely lightweight expanded graphite powder is produced, typically with a density of 0.003 $g/cm^3$ (3 $kg/m^3$) to 0.005 $g/cm^3$ (5 $kg/m^3$);
- this powder is placed in a compression chamber with an appropriate geometry to achieve the required shapes;
- the powder is compressed until a solid with the required density is obtained.

The ratio between the density of the initial powder and the density of the finished product makes it necessary to stack powder to a height at least 40 times more than the thickness of the required insulation product. Thus, if the objective is to obtain a 10 mm-thick thermal insulation product (typical value for carbon fibre felts), a mould with a minimum height of 400 mm has to be filled and slow compression has to be applied over a distance of at least 390 mm. Therefore, the method is not very productive and quality defects are easily produced, caused by difficulties in "degassing" the powder during the compression phase and by material heterogeneity.

4) due to their fragility, structures based on expanded graphite particles that have been compressed with a low compression ratio have the defect that they release graphite particles that are not well bonded to the material mass. This causes undesirable pollution in the chambers to be insulated and this pollution is a particularly severe handicap in industries such as those dedicated to the manufacture of semiconductors, in which cleanliness is of overriding importance.

In order to obtain thermal insulation materials which are particularly suitable for high temperature furnaces operating in a non-oxidising atmosphere, some patents disclose the use of multilayer sheets comprising at least one flexible layer made of a material based on compressed expanded graphite particles.

Thus, U.S. Pat. No. 4,279,952 describes a composite structure containing two of the forms of carbonaceous insulation mentioned above; one flexible carbon fibre felt layer (density between 60 and 100 $kg/m^3$) is bonded to at least one flexible sheet made of a material based on compressed expanded graphite particles with a density of between 600 and 1600 $kg/m^3$. The bond between the two layers is made by a carbon-based binder, for example a carbonisable polymeric resin.

However, this composite structure has disappointing thermal insulation properties considering its relatively high cost, and the risk of pollution of the chamber is not fully eliminated since flexible felts are sources of large amounts of dust. In particular, fibrils originating from the visible edges of the felts become detached, and they are very easily carried in the air because they are so small.

Another structure is proposed by U.S. Pat. No. 4,888,242. In this patent the layers in the multilayer are not intimately bonded to each other over their entire surfaces since some layers (made of materials based on compressed expanded graphite particles) are corrugated before being connected to other layers that remain flat; contact surface areas between layers are small which improves the thermal insulation properties of the multilayer thus formed. However, this type of structure is difficult to make. If it is to contain a small number of layers, then large amplitude corrugations are necessary which are firstly difficult to produce, and secondly weaken the structure due to compression forces applied perpendicular to the flat surfaces. In practice, small amplitude corrugations are necessary, therefore there will be a large number of corrugated layers to be stacked in the structure, which implies a lot of gluing. The structure finally obtained has a fairly high average density and fairly disappointing thermal insulation properties, considering its high manufacturing cost.

Finally, U.S. Pat. No. 6,413,601 describes a thermal insulation furnace jacket obtained by using a flexible strip made of a material based on compressed expanded graphite particles, the said strip being wound spirally in several layers. The layers are bonded to each other by a bonding material, typically a phenolic resin. Resin degassing problems during carbonation are avoided by inserting a material, which decomposes under the effect of heat between two layers of the spiral which are coated with phenolic resin. Typically, a paper sheet is used, and as the paper decomposes it creates diffusion paths through which gases derived from carbonation of the resin will escape.

The applicant has attempted to make under satisfactory economic conditions a thermal insulation structure that does not have the disadvantages mentioned above and that can be used in the manufacture of thermal insulation elements, particularly insulation for furnaces operating at high temperatures and in non-oxidising atmosphere.

SUMMARY OF THE INVENTION

A first purpose of the invention is a thermal insulation structure comprising at least one flexible layer based on compressed expanded graphite particles characterised in that the density of this layer is equal to at least $0.4$ g/cm$^3$ ($400$ kg/m$^3$) and in that the said thermal insulation structure also comprises another layer based on compressed graphite particles with a lower density, typically less than $0.4$ g/cm$^3$ ($400$ kg/m$^3$).

The two layers are preferably adjacent and are bonded to each other by a binder obtained by carbonation of a binding agent typically a liquid rich in carbonaceous material, e.g. a phenolic resin, a furfuryl resin, a pitch, etc. These layers may have discontinuous contact surfaces as in U.S. Pat. No. 4,888, 242 but preferably the two adjacent layers are intimately bonded together over their entire contact surface by the carbonaceous binder. For conciseness, we will call the first layer the "dense expanded graphite layer" and the second layer the "sub-dense expanded graphite layer" In the remainder of this description.

Thus, the present invention makes it possible to obtain thermal insulation structures made by a combination of layers based on expanded graphite particles compressed to different densities and bonded together, this solution avoiding the problems mentioned above and even making it possible to benefit from the excellent thermal insulation properties of expanded graphite when it is used at very low density.

The structure according to the invention benefits from the complementary properties of the two layers. The layer based on compressed graphite particles with a higher density (the dense expanded graphite layer) has good mechanical strength and this property is also conferred to the resulting structure. The layer based on compressed graphite particles with a lower density (the sub-dense graphite layer) is significantly more fragile than the first layer but it has better thermal insulation properties, so that the resulting structure can be used for the manufacture of thermal insulation elements such as jackets for high temperature furnaces. Moreover, since it is porous, it enables diffusion of gases emitted during the phase in which the carbonaceous binder that binds the two layers is being carbonised, which avoids the formation of defects in the said bonding layer.

Joining and gluing two dense layers to each other introduces degassing problems and special solutions have to be adopted such as those described in U.S. Pat. No. 6,413,601. Thus, the combination of a non-dense material and a dense material enables gases emitted during the heat treatment phase originating from decomposition of the bonding material to be easily evacuated by diffusion through the non-dense material that has retained a very high permeability to gases. Therefore, according to this invention, it is important to maintain the presence of a sub-dense layer of expanded graphite close to the binder obtained by carbonation.

The structure according to the invention has at least one alternation of adjacent dense and sub-dense layers with different physical properties and different thicknesses; the layer based on compressed graphite particles having a higher density (the dense expanded graphite layer) may also be as thin as possible, but sufficiently dense to give the global structure the required flexibility and mechanical strength. The layer based on compressed graphite particles with a lower density (the sub-dense expanded graphite layer) may also be as thick as possible to increase the global thermal insulation of the structure.

A typical two-layer structure according to the invention comprises the following two adjacent layers:
a) a "thick" layer preferably less than 40 mm thick, typically between 5 and 20 mm, which is not very dense, by limiting the density obtained by compression of graphite particles to small values of the order of $0.1$ g/cm$^3$ ($100$ kg/m$^3$) and typically within the range of $0.05$ g/cm$^3$ ($50$ kg/m$^3$) to $0.30$ g/cm$^3$ ($300$ kg/m$^3$), the said layer being unsuitable for use as thermal insulation by itself due to its excessive fragility;
b) a "thin" layer, preferably with a thickness of less than 2 mm, and typically between 0.15 and 1.5 mm thick, with a density typically within the $0.5$ to $1.6$ g/cm$^3$ ($500$ to $1600$ kg/m$^3$) range.

The elementary structure composed of two adjacent layers made of expanded graphite compressed to different densities and bonded to each other by means of a carbonaceous binder may be used directly for making insulation elements for high temperature furnaces. In this case, an oriented structure will preferably be used such that its face occupied by the dense layer of expanded graphite surrounds the furnace chamber protecting the latter from possible emission of particles originating from the sub-dense layer.

This type of elementary structure can also be stacked on itself several times so as to obtain a structure with alternating dense and sub-dense layers which can give a consistent and thick thermal insulation assembly. In this case, the elementary thicknesses of dense and sub-dense expanded graphite layers are different but the total thicknesses of each are preferably in accordance with the values of the typical two-layer structure provided above.

Preferably, to avoid possible pollution by emission of particles originating from the sub-dense layer with a low mechanical strength, the thermal insulation element obtained by stacking the elementary structure according to the invention also has all its outside faces covered by a layer of expanded graphite compressed to a density of more than 0.4 g/cm$^3$ (400 kg/m$^3$), and preferably between 0.5 and 1.6 g/cm$^3$ (500 to 1600 kg/m$^3$).

The thermal insulation structure according to the invention can be used to make insulating elements with different shapes using various methods:

- a thick multilayer strip is made by lamination/gluing/carbonation of the binding agent. Elementary bricks are made by cuffing them out of the strip. Shapes adapted to the application concerned can also be cut out directly;
- at least two thin two-layer strips are made by lamination and gluing. Two strips are assembled by co-lamination, in which one face of at least one strip consists of a sub-dense layer and the interface is glued using a carbonisable liquid binder. This operation is repeated as many times as necessary to obtain a multilayer strip with the required thickness. The binder is carbonised, and the elementary bricks are then cut out or they are cut to shape, as in the previous example;
- a multilayer strip is made by lamination/gluing/carbonation of the binding agent and a cylindrical jacket is then made by winding the said strip spirally on one or more layers, after gluing at least one of the faces with a binding agent, preferably a face occupied by a sub-dense layer. The cylindrical jacket is obtained by winding the number of layers necessary to obtain the required thickness in spiral form. The strip is sufficiently flexible to accept the imposed bending without damage during winding. If the sub-dense layer is thin enough, it can be wound spirally with the sub-dense layer on the outside face (the convex side), even if the sub-dense layer is not very resistant to tension stresses. For example, a 200 mm diameter cylindrical jacket was made by winding a two-layer structure consisting of a 5 mm thick sub-dense layer with a density of 0.15 g/cm$^3$ glued onto an 0.5 mm thick dense layer with a density of 1 g/cm$^3$. If the sub-dense layer is thicker or even less dense, the dense layer that has better resistance to tension stresses generated by binding when winding, is preferably placed towards the outside of the cylinder (the convex side). Regardless of the position of the sub-dense layer (on the concave or the convex side), the cylindrical face of the cylindrical jacket obtained that is occupied by the sub-dense layer is preferably covered, for example, with a flexible strip of dense compressed expanded graphite, itself, if necessary, glued with a binding agent. Once the winding has been completed and the glued dense flexible strip has been deposited on the face occupied by the sub-dense layer, the jacket is heat treated to carbonise the binding agent located between the wound layers. This is usually done by applying a heat treatment under a non-oxidising atmosphere at a temperature equal to at least the temperatures that the thermal insulation will need to resist during use (typically 800° C., and preferably 1000° C. or more);
- a non-dense strip is chosen with a sufficient density and/or a sufficiently thin strip to be able to resist shaping by bending without damage, glue is then applied to at least one face, which is afterwards covered by a thin dense layer and a thermal carbonation treatment is finally carried out on the binding agent;
- for complex shapes, moulding to the required shape is done using expanded graphite that is slightly compressed to obtain the sub-dense quality with the required thermal insulation properties and the surface of the moulded part is then glued, covered with a thin dense layer and a carbonation heat treatment is carried out on the binding agent. In the latter case, the thickness of the sub-dense expanded graphite layer is not necessarily uniform.

Regardless of the production process used, the thermal insulation element made using an insulating structure according to the invention has innovative and attractive properties. Example 1 illustrates an insulating element obtained from a structure according to the invention and presents the advantages obtained compared with insulating elements according to the prior art. The invention also covers a thermal insulation element of this type forming part of the wall of the chamber of a furnace operating at high temperatures, typically more than 800° C. and in a non-oxidising atmosphere. It may be in the form of bricks, such that the assembly of several of these bricks forms the surface of the furnace chamber, or in the form of a cylindrical wall in one or more parts making up the furnace combustion chamber.

Another purpose of the invention is a process for manufacturing the said structure according to the invention.

The first step is producing at least two components based on compressed graphite particles according to the known prior art, such as the process described in U.S. Pat. No. 3,404,061 (milling, attack of the spaces between hexagonal reticular planes by an oxidising or halogenated agent, impregnation with water, heating to a temperature of more than 100° C.) or the process described in U.S. Pat. No. 5,582,781 (milling, immersion in liquid nitrogen then thermal shock).

A "thick" and not very dense strip is made with a thickness of less than 40 mm, typically between 5 and 20 mm thick, by limiting the density obtained by compression to low values (of the order of 0.1 g/cm$^3$ (100 kg/m$^3$) and typically within the range 0.05 g/cm$^3$ (50 kg/m$^3$) to 0.30 g/cm$^3$ (300 kg/m$^3$). A "thin", dense, strip with a thickness of less than 2 mm, and typically between 0.15 and 1.5 mm, and a density typically within the range 0.5 to 1.6 g/cm$^3$ (500 to 1600 kg/m$^3$), is also made. These two products can be made in the form of a continuous strip, using typical equipment used to make flexible graphite sheets (rolling lines), by taking the strip either from the part of the upstream side of the rolling lines (used for shaping flexible graphite sheets) to obtain the "thick" sub-dense layer, or in the part on the downstream side of the said rolling lines to obtain the dense thin layer. The process is fast and economic, but it is only suitable for production of continuous strips with fixed width (typically 1 m or 1.50 m wide), which then have to be cut to obtain complex shapes if required.

Obviously, the mould/compression filling technique could also be used to make these products and to obtain the required density, but this process is more expensive in terms of cycle time and labour time, and is also more flexible with regard to the shapes obtained.

The two layers with different natures are then joined or assembled by gluing to form sandwich or multilayer structures, which will comprise alternating non-dense thick layers and dense thin layers, with a minimum of at least two elements.

The gluing technique typically consists of coating the non-dense thick layer with a carbon rich liquid solution, e.g. a phenolic resin, a furfuryl resin, pitch, etc. Almost all solvents in the solution, if any, are then eliminated by slow drying. The next step is to apply a dense thin layer on the coated surface followed by a heat treatment process under a non-oxidising atmosphere and at a temperature equal to at least the temperatures that the thermal insulation will have to resist during use (typically 800° C. and preferably 1000° C. or more).

One variant embodiment of manufacturing an insulating element with a structure according to the invention is making a thin non-dense layer that is afterwards consolidated by a dense layer added to it the applicant has demonstrated that it is possible to bend thick non-dense layers before gluing for strip thicknesses of up to 25 mm. After bending, these strips placed in the shape of an arc are glued and dense reinforcing layers are applied onto one or both faces. The assembly is then heat treated while being held in (bent) shape by a graphite conforming jig surrounding the product. The structure at the output from the heat treatment is curved, geometrically stable in the form of an arc. A combination of these arcs can give circular cylindrical thermal insulation assemblies, and this shape is used on many furnaces operating under a vacuum and at high temperatures.

In another variant, flexible thin multilayer sheets are produced, composed of alternating dense expanded graphite layers and non-dense expanded graphite layers. It has been demonstrated that one of these sheets can be wound on itself around a spiral without using the bending technique. The assembly is heat treated in an appropriate assembly holding the spiral in place. The structure at the output from the treatment is a geometrically stable cylindrical structure composed of a continuous sheet that can be used as circular thermal insulation element for furnaces. Preferably, the flexible strip used is a dense/sub-dense two-layer or a sub-dense/dense/sub-dense three-layer material, such that gases emitted during the final carbonation treatment of the binding agent can diffuse without generating any defects. Preferably, its internal face (the bore) and external face are covered with a thin layer of dense expanded graphite, to provide the cylindrical structure thus made with good mechanical strength and to prevent unwanted pollution of the furnace.

EXAMPLE

The applicant made an elementary brick with a structure consisting of a 10 mm thick non-dense layer (0.1 g/cm$^3$ (100 kg/m$^3$)) sandwiched between two dense layers (1 g/cm$^3$ (1000 kg/m$^3$)) each 0.5 mm thick the complete assembly being made in the form of a board with dimensions 500 mm×500 mm×11 mm.

A "thick", non-dense, 10 mm thick strip is obtained by limiting the density by compression to 0.1 g/cm$^3$ (100 kg/m$^3$). Two "thin", dense, 0.5 mm thick strips are obtained by compressing the expanded graphite particles until a density of 1 g/cm$^3$ (1000 kg/m$^3$) is obtained.

These strips are obtained using a conventional installation for the continuous production of flexible graphite sheets called "Papyex" (registered trademark) and made by the applicant. This conventional installation comprises rolling lines capable of making strips up to 1.5 m wide. The thick strip is taken from the upstream side of the rolling lines and the thin strips are taken from the downstream side.

The limitation to the thickness and density required for the non-dense element makes it possible to use these conventional installations that are capable of producing strips with weight per unit area typically between 500 and 3000 g/m$^2$ (the thicknesses of which will vary during the various rolling steps), in other words that are capable of continuously producing strips with a density of 0.1 g/cm$^3$ (100 kg/m$^3$) and thicknesses of up to 30 mm.

This type of continuous production is capable of very significantly reducing costs compared with moulding/compression processes, the cost ratio for a given volume of thermal insulation produced being of the order of 2.5 or more, with the continuous solution being less expensive. Finally, it is important to mention the advantage of the continuous process for stability of properties of the products obtained, which is significantly easier to guarantee than with production by moulding of individual parts.

Once these strips have been made and collected, the next step is to co-laminate a thick strip sandwiched between two thin strips, each interface being previously coated with a phenolic resin, which is a carbonisable liquid binding agent. The assembly is then heated up to a temperature close to 1000° C. which causes carbonation of the binding agent. The bricks are then cut to the required dimensions.

This type of brick has the following advantageous properties:
1) emission of particles through the faces of the structure: this is typical of particle emissions through flexible graphite sheets. The compressed expanded graphite sheets emit almost no particles when the density is greater than 1 g/cm$^3$ (flexible graphite sheets). They emit a few fairly large particles when the density is less than 0.2 g/cm$^3$. Compared with structures including carbon fibre felts, like those described in U.S. Pat. No. 4,279,952, structures comprising low density compressed expanded graphite do not represent unwanted dust sources to such an extent, since the number of emitted particles is small and their large dimensions do not facilitate dispersion; they "drop" rather than "fly";
2) mechanical bending strength resisting a load applied perpendicular to the main faces: ultimate strength 3 MPa, to be compared with 0.7 MPa for structures based on expanded graphite particles compressed to 0.2 g/cm$^3$ (200 kg/m$^3$) and not bonded to dense layers;
3) thermal conductivity at low temperature measured by resistance to the passage of a thermal flux perpendicular to the main faces: with a hot face kept at 200° C.: 0.35 W/m.K to be compared with 0.6 W/m.K measured under the same conditions on a structure based on expanded graphite particles compressed to 0.2 g/cm$^3$ (200 kg/m$^3$) (advantage of the low density in the case of the composite structure);
4) low chemical reactivity of the sandwich, for example in comparison with carbon felt, due to the use of a layer of dense compressed expanded graphite with very low permeability to gases and a very good chemical inertia, on the faces. This final point demonstrates the advantage of this type of structure in comparison, for example, with the structure described in U.S. Pat. No. 4,279,952, in which the composite structure contains a carbon fibre felt that is chemically more reactive than the compressed expanded graphite.

ADVANTAGES

Rigid thermal insulation structures according to the invention can be made from an abundant and inexpensive raw material (complexed natural graphite that is obtained in the phase preceding the expansion step resulting in expanded natural graphite). Other types of rigid insulation based mainly on carbon fibres start from a significantly more noble raw material, five to ten times more expensive. If shaping costs are included, there is no exaggeration in saying that thermal insulation according to the invention is about 30% less expensive to make than more conventional thermal insulation systems for the same thermal insulation function, except carbon black based systems but, for those, there are other severe problems with systems made from carbon black that might even make them unacceptable, and particularly cleanliness properties.

The invention claimed is:

1. A thermal insulation multi-layer structure, comprising:
at least one flexible dense compressed expanded graphite layer based on compressed expanded graphite particles, and a density of the flexible dense compressed expanded graphite layer is between 0.5 and 1.6 g/cm$^3$ (500 and 1600 kg/m$^3$); and
at least one sub-dense compressed expanded graphite layer, based on compressed graphite particles with a lower density, which is between 0.05 and 0.3 g/cm$^3$ (50 and 300 kg/m$^3$), said dense and sub-dense layers being adjacent and bonded to each other.

2. The thermal insulation structure according to claim 1, in which said dense and sub-dense layers made of compressed expanded graphite are adjacent and are bonded to each other by carbonation of a carbonisable binding agent.

3. The thermal insulation structure according to claim 2, in which the adjacent dense and sub-dense layers made of compressed expanded graphite are intimately bonded together over their entire contact surface.

4. The thermal insulation structure according to claim 1, obtained by stacking said adjacent dense and sub-dense layers, with one alternation of dense and sub-dense layers made of compressed expanded graphite.

5. The thermal insulation structure according to claim 1 in which said sub-dense layer or layers made of compressed expanded graphite have a total thickness of less than 40 mm.

6. The thermal insulation structure according to claim 1, in which said dense layer or layers made of compressed expanded graphite have a total thickness of less than 2 mm.

7. A thermal insulation element designed to be fitted on furnaces operating in a non-oxidising atmosphere and at temperatures of more than 800° C., wherein the thermal insulation element comprises a thermal insulation structure according to claim 1.

8. The thermal insulation element according to claim 7, wherein the thermal insulation element forms part of a wall of a combustion chamber of the furnace operating at temperatures of more than 800° C. and in a non-oxidising atmosphere.

9. The thermal insulation element according to claim 8, wherein the thermal insulation element is in a form of a brick, such that an assembly of several of these bricks forms a surface of the combustion chamber of said furnace.

10. The thermal insulation element according to claim 8, wherein the thermal insulation element is in a form of a cylindrical wall in one or more parts making up the combustion chamber of the said furnace.

11. The thermal insulation element according to claim 7, wherein the thermal insulation element has an apparent surface covered with a dense compressed expanded graphite layer with a density of more than 0.4 g/cm$^3$ (400 kg/m$^3$).

12. The thermal insulation structure according to claim 2, wherein the carbonisable binding agent comprises resin, furfuryl resin or pitch.

13. The thermal insulation structure according to claim 1, in which the said sub-dense layer or layers made of compressed expanded graphite have a total thickness between 5 and 20 mm.

14. The thermal insulation structure according to claim 1, in which the said dense layer or layers made of compressed expanded graphite have a total thickness between 0.5 and 1.5 mm.

15. The thermal insulation element according to claim 7, wherein the thermal insulation element has an apparent surface covered with a dense compressed expanded graphite layer with a density between 0.5 and 1.6 g/cm$^3$ (500 and 1600 kg/m$^3$).

16. The thermal insulation element according to claim 1, wherein the layers are not impregnated with binder.

* * * * *